Nov. 28, 1933.    G. H. KOCH    1,936,794
WELDING APPARATUS
Filed June 11, 1931    2 Sheets-Sheet 2

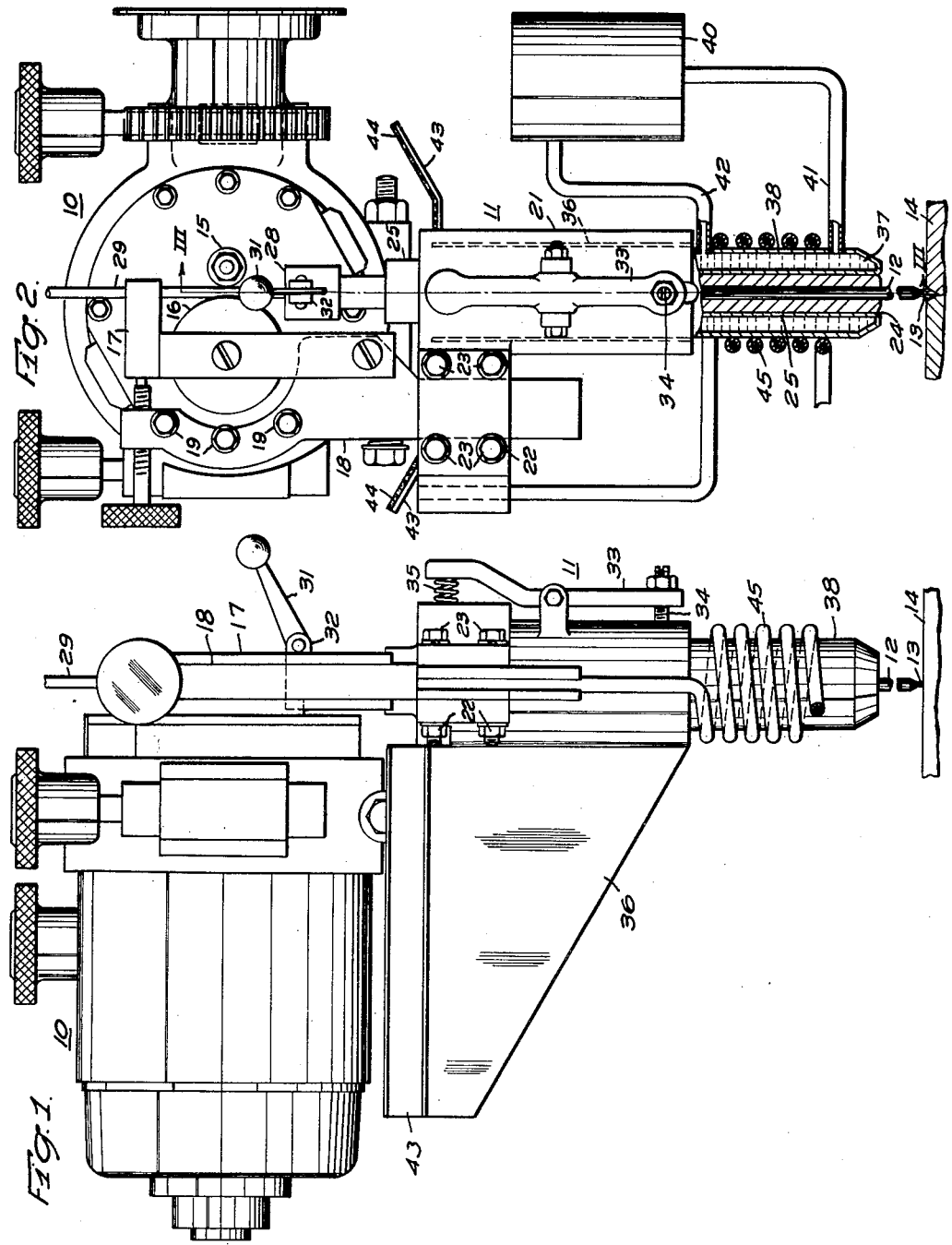

WITNESSES
E. A. McCloskey
Robert R. Lockwood

INVENTOR
Gustav H. Koch.
BY
W. R. Coley
ATTORNEY

Patented Nov. 28, 1933

1,936,794

UNITED STATES PATENT OFFICE 1,936,794

WELDING APPARATUS

Gustav H. Koch, Salem, Ohio, assignor to Westinghouse Electric & Manufacturing Company, a corporation of Pennsylvania Application June 11, 1931. Serial No. 543,508

9 Claims. (Cl. 219—8)

My invention relates, generally, to arc welding apparatus, and, more particularly, to automatic arc welding apparatus in which a carbon electrode is fed to perform a welding operation.

The object of my invention, generally stated, is the provision of a nozzle through which a carbon electrode may be fed that shall be simple and efficient in operation and readily and economically manufactured and utilized.

A more specific object of my invention is to provide for feeding and retracting a carbon electrode and for conducting current thereto.

Another object of my invention is to provide for removing the heat developed in the nozzle during the welding operation.

A further object of my invention is to provide for stabilizing the welding arc.

Other objects of my invention will, in part, be obvious and, in part, appear hereinafter.

The invention accordingly, is disclosed in the embodiment shown in the accompanying drawings, and comprises the features of construction, combination of elements and arrangement of parts which will be exemplified in the construction hereinafter set forth and the scope of the application of which will be indicated in the claims.

For a more complete understanding of the nature and objects of the invention, reference may be had to the following detailed description, taken in connection with the accompanying drawings, in which;

Figure 1 is a side view, in elevation, of a welding head shown in conjunction with a welding nozzle constructed in accordance with my invention.

Fig. 2 is a front view, in elevation, of the apparatus shown in Fig. 1, parts being broken away to show the construction of the cooling chamber.

Figure 3:
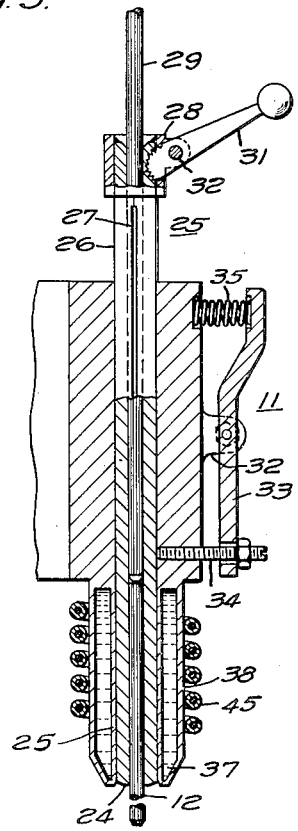
Fig. 3 is a vertical sectional view taken along the line III—III of Fig. 2.

Referring to Figs. 1 and 2 of the drawings, the apparatus there shown comprises, generally, a welding head 10 having a nozzle 11 attached thereto for guiding a welding electrode 12, to maintain a welding arc 13 between the electrode and the work 14, along the abutting edges of which a seam is to be welded.

The welding head 10 is provided with an electric motor for driving a feed roller 15. An idler roller 16 for cooperating with the feed roller 15, is carried by a support member 17 which is pivotally mounted on a bracket 18. As illustrated, the bracket 18 is attached, by means of bolts 19, to the welding head 10 and has integral therewith a lower depending portion for supporting the welding nozzle 11. Since the welding head is fully shown in conjunction with this invention is fully described in my copending application No. 503,402, filed December 19, 1930, and assigned to Westinghouse Electric & Manufacturing Company, it is not thought necessary to describe it further in this specification.

When it is desired to perform a welding operation with an automatically fed carbon electrode, it is necessary to provide a special nozzle in order to utilize the relatively short lengths of electrode that are commercially available. Furthermore, it is not desirable to provide the electrode with means for attaching it to a feeding mechanism and connecting it to the welding circuit, since this would considerably increase the cost of the electrode. Therefore, it is desirable to provide a nozzle in which the electrode may be inserted, to be automatically fed forwardly or retracted by the welding head, and in which the current may be conducted to the electrode while it is being fed. Furthermore, in order to maintain the carbon electrode and the nozzle in the solid state, it is necessary to dissipate the heat that is produced at the lower end of the nozzle by the carbon arc. In some instances, it is desirable to subject the arc to the influence of a magnetic field in order to stabilize its operation under certain conditions when the magnetic circuit surrounding the arc becomes unbalanced.

In order to feed a commercial carbon electrode without expensive modifications thereof, the nozzle 11 is provided, having a main body member 21 and laterally extending arms 22. As shown, the arms 22, together with bolts 23, serve as a clamp by means of which the nozzle 11 may be attached to the lower depending portion of the bracket 18. The main body member of the nozzle is preferably constructed of copper in order to obtain suitable electrical conductivity. It will be noted that it is relatively massive in size in order to provide the desired thermal capacity.

With reference now to Fig. 3 of the drawings, it will be readily seen that the welding nozzle 11 is provided with an aperture 24 extending longitudinally therethrough. Within the aperture 24, an electrode holder 25 is located, which may be constructed from any suitable material, such as steel.

The electrode holder 25 may be formed from two hollow semi-cylindrical members 26 having slots 27, between their adjacent edges, extending nearly the entire length thereof. As shown, the upper ends of the members 26 are closely fitted together and are inserted in a clamping ring 28 to which they are securely welded. The ring 28 also serves as a stop to limit the downward travel of the electrode holder 25.

In order to feed the welding electrode 12, which is carried, as shown, within the electrode holder 25, a feed rod 29 is provided, which is also located partly within the the electrode holder 25. The upper end of the feed rod 29 is located between the idler roller 16 and the feed roller 15 and is moved either upwardly or downwardly, depending on the direction of rotation of the feed roller.

When the feed roller 14 is rotated in such direction as to cause the feed rod 29 to move downwardly, the electrode 12 will be moved downwardly relative to the nozzle 11 and may also move relative to the electrode holder 25. It will be readily understood that the electrode holder 25 may be moved downwardly or will remain stationary, depending upon the relative values of the friction forces between the electrode holder 25 and the nozzle 11, and between the feed rod 29, the electrode 12 and the electrode holder 25. In the event that the electrode holder 25 is moved downwardly, its movement will be limited by the ring 28 which will engage the top of the main body member 21 of the nozzle 11. On further downward movement of the feed rod 29 the electrode 12 will be fed downwardly relative to both the nozzle 11 and to the electrode holder 25.

When the arc is struck and at such times as the arc becomes too short, it is necessary to withdraw the electrode 12 to obtain the desired arc conditions. The electrode holder 25 is then moved upwardly by the feed rod 29 and withdraws therewith the electrode 12. In order to cause the feed rod 29 to withdraw the electrode holder 25, a ratchet lever 31 is eccentrically mounted, as shown, in a bifurcated bracket 32 carried by the ring 28. It will then be readily understood that the feed rod 29 may be moved downwardly relative to the electrode holder 25 but that, when the feed roller 15 is reversed to retract the electrode, both the feed rod and the electrode holder are moved together in the upward direction because of the functioning of the ratchet lever 31.

In order to provide suitable clamping pressure between the cylindrical members 26 of the electrode holder 25 and the carbon electrode 10 and, in addition, to provide proper electrical contact between the electrode holder 25 and the nozzle 11, an adjusting lever 33 is utilized. As shown, the adjusting lever is pivotally mounted on the nozzle 11, having a threaded rod 34 located at one end thereof disposed to be forced into engagement with the electrode holder 25 by means of a suitable compression spring 35 located at the other end to cause the electrode holder to frictionally engage the nozzle 11. The adjusting lever 33 may be manually depressed at its upper end to disengage the rod 34 from the electrode holder to permit the free movement of the electrode holder 25 within the nozzle 11.

As set forth hereinbefore, considerable heat is produced in the nozzle 11 during the welding operation. In order to dissipate the heat, radiating fins 36, having a relatively large surface area, are attached to the main body member 21 to conduct part of the heat from the nozzle 11 to the surrounding air. It will be readily seen that a single fin or several fins may be employed to dissipate the heat from the nozzle.

Additional heat-dissipating means may be provided by forming a cooling chamber 37 in the lower portions 38 of the nozzle 11, and supplying thereto a cooling fluid, such as water, from a reservoir 40 through pipes 41 and 42. The use of a cooling chamber surrounding a welding electrode and a suitable fluid for conducting the heat therefrom has proved, experimentally, to give very satisfactory results and to permit the utilization of higher welding current densities in the electrode than it has been possible heretofore. It will be understood, however, that, if the cooling chamber is not used, the lower portion 38 of the nozzle may be constructed as a solid member, integral with the main body member, to permit the conduction of the welding current to the electrode as near the arc as possible and, in addition, to remove part of the heat from the electrode.

In order to insulate the welding head 10 from the direct radiation of the intense heat of the welding arc 13, a copper shield 43 may be provided, as shown, and be secured to the radiating fins 36. A layer of suitable material 44, such as asbestos, may be placed on the upper surface of the shield 43 to further insulate the welding head from the heat of the arc.

Figure 4:
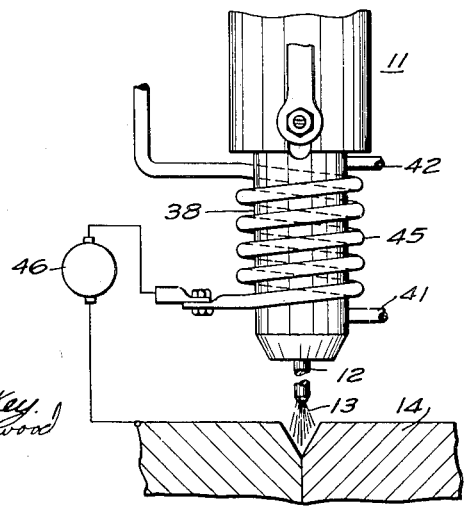
Fig. 4 is a diagrammatic view of an arc welding circuit organized in accordance with the invention.

It is desirable, under certain welding conditions, to apply a magnetic field to the welding arc in order to stabilize its operation. As is more clearly shown in Fig. 4, a coil 45, of a suitable insulated conductor, is located around the lower portion 38 of the nozzle 11 and is connected in series-circuit relation, to a welding generator 46. Referring to Figs. 2 and 4, the welding circuit may be readily traced from the generator 46, through the coil 45, to the clamp 22, thence, through the main body member 21 and the lower portion 38 of the nozzle 11, to the electrode holder 25 and the welding electrode 12. From the electrode 12, the circuit is completed, through the welding arc 13 and the work 14, to the generator 46.

In order to increase the effectiveness of the magnetic coil 45 for stabilizing the welding arc, the electrode holder 25 should preferably be constructed of a magnetic material, such as steel. It will then be readily seen that a considerable portion of the magnetic flux that is set up by the coil 45 will be concentrated in the vicinity of the arc, where its application will have the maximum effect.

Since certain changes may be made in the above construction, and different embodiments of the invention may be made without departing from the scope of the invention, it is intended that all matter contained in the above description or shown in the accompanying drawings, shall be interpreted as illustrative and not in a limiting sense.

I claim as my invention:

1. In arc welding apparatus, in combination, an electrode guiding nozzle mounted in spaced relation to work on which a welding operation is to be performed, an electrode holder slidably disposed within the nozzle and adapted to permit longitudinal movement of the electrode therein, and feeding means operatively engaging the electrode and the electrode holder to effect the forward feeding of the electrode relative to the nozzle and the electrode holder and the retraction of the electrode relative only to the nozzle.

2. The combination with a welding head disposed to feed a welding electrode to work having abutting edges along which a seam is to be welded and a welding circuit for maintaining an arc between the electrode and the work, of a nozzle having a longitudinal aperture extending therethrough, said nozzle being disposed in fixed relation relative to the welding head, a bifurcated electrode holder slidably mounted within the aperture, a rod disposed to be moved by the welding head and to cooperate with the electrode holder to feed the welding electrode to the work, and spring-biased means associated with the nozzle for maintaining electrical contact between the welding electrode and the welding circuit.

3. A nozzle for use in arc welding apparatus wherein an electrode is fed to perform a welding operation comprising, in combination, a main body member of large thermal capacity having an aperture extending longitudinally therethrough, a support bracket extending laterally from the body member, a bifurcated electrode holder located within the aperture of the main body member, ratchet means pivotally carried by the electrode holder at its upper end, a rod disposed to cooperate with the ratchet means to feed the electrode forwardly relative to the main body member and to the electrode holder and to retract the electrode relative only to the main body member, and a plurality of radiating fins extending from the main body member to dissipate the heat developed therein during the welding operation.

4. An electrode guide for arc welding apparatus wherein an arc is maintained between an electrode and work on which a welding operation is to be performed comprising, in combination, a nozzle having an aperture extending longitudinally therethrough, a support member for the nozzle, a bifurcated electrode holder located within the aperture of the nozzle, a rod located within the electrode holder and a ratchet lever carried by the electrode holder at its upper end, said ratchet lever being pivotally mounted to permit relative movement between the rod and the electrode holder when the rod is moved downwardly and to prevent relative movement between them when the rod is moved upwardly.

5. An electrode guide for arc welding apparatus wherein an arc is maintained between an electrode and work on which a welding operation is to be performed comprising, in combination, a nozzle having an aperture extending longitudinally therethrough, a support member for the nozzle, a bifurcated electrode holder located within the aperture of the nozzle, a rod located within the electrode holder, a ratchet lever carried by the electrode holder at its upper end, said ratchet lever being pivotally mounted to permit relative movement between the rod and the electrode holder when the rod is moved downwardly and to prevent relative movement between them when the rod is moved upwardly, and a spring-biased lever carried by the nozzle and disposed to cooperate with the electrode holder to maintain electrical contact between the electrode and the nozzle.

6. An electrode guide for arc welding apparatus wherein an arc is maintained between an electrode and work on which a welding operation is to be performed comprising, in combination, a nozzle having an aperture extending longitudinally therethrough, a support member for the nozzle, a bifurcated electrode holder disposed for movement within the aperture of the nozzle, a feed rod disposed within the electrode holder, a ratchet lever carried by the electrode holder at its upper end, said ratchet lever being pivotally mounted to permit relative movement between the feed rod and the electrode holder when the feed rod is moved downwardly and to prevent relative movement between them with the rod is moved upwardly, and a cooling chamber carried by the nozzle, said cooling chamber being provided with inlet and outlet connections for circulating a cooling medium.

7. An electrode guide for arc welding apparatus wherein an arc is maintained between an electrode and work on which a welding operation is to be performed comprising, in combination, a nozzle having an aperture extending longitudinally therethrough, means for supporting the nozzle, a bifurcated electrode holder located within the aperture of the nozzle, a rod located within the electrode holder, a ratchet lever carried by the electrode holder, at its upper end, said ratchet lever being pivotally mounted to permit relative movement between the rod and the electrode holder when the rod is moved downwardly to forwardly feed the electrode and to prevent relative movement between them when the rod is moved upwardly to retract the electrode, and a coil connected in series circuit relation to the arc and located near the arcing end of the electrode, said coil being disposed to produce a magnetic field to stabilize the arc during the welding operation.

8. An electrode guide for arc welding apparatus wherein an arc is maintained between an electrode and work on which a welding operation is to be performed comprising, in combination, a nozzle having an aperture extending longitudinally therethrough, a support member for the nozzle, a bifurcated electrode holder located within the aperture of the nozzle, a rod located within the electrode holder, a ratchet lever carried by the electrode holder at its upper end, said ratchet lever being pivotally mounted to permit relative movement between the rod and the electrode holder when the rod is moved downwardly and to prevent relative movement between them when the rod is moved upwardly, and a plurality of radiating fins extending from the nozzle to dissipate the heat developed therein during the welding operation.

9. An electrode guide for use in arc welding apparatus in which an arc is maintained between an electrode and work on which a welding operation is to be performed comprising, in combination, a nozzle having an aperture extending longitudinally therethrough, a bifurcated electrode holder located within the aperture, a rod located within the electrode holder, a ratchet lever carried by the electrode holder at its upper end, said ratchet lever being pivotally mounted to permit relative movement between the rod and the electrode holder when the rod is moved downwardly and to prevent relative movement between them when the rod is moved upwardly, a spring biased lever carried by the nozzle and disposed to cooperate with the electrode holder to maintain electrical contact between the electrode and the nozzle, a cooling chamber carried by the nozzle, an inlet pipe to the cooling chamber, an exhaust pipe from the cooling chamber, a plurality of radiating fins extending vertically from the nozzle, an insulating shield carried by the radiating fins and a coil connected in series-circuit relation to the arc and positioned around the cooling chamber to produce a magnetic field for stabilizing the arc during the welding operation.

GUSTAV H. KOCH.